US008257209B1

(12) United States Patent
Lane et al.

(10) Patent No.: US 8,257,209 B1
(45) Date of Patent: Sep. 4, 2012

(54) VERSATILE VARIABLE GEAR RATIO TRANSMISSION

(76) Inventors: Joseph C. Lane, Venetia, PA (US); Robert S. Siegwart, Pittsburgh, PA (US); Thomas P. O'Donnell, Venetia, PA (US)

( * ) Notice: Subject to any disclaimer, the term of this patent is extended or adjusted under 35 U.S.C. 154(b) by 0 days.

(21) Appl. No.: 13/083,705

(22) Filed: Apr. 11, 2011

(51) Int. Cl.
*F16H 9/10* (2006.01)

(52) U.S. Cl. .............................. 474/53; 474/56; 474/70

(58) Field of Classification Search .............. 474/47–56, 474/64, 69–70
See application file for complete search history.

(56) References Cited

U.S. PATENT DOCUMENTS

| | | | | |
|---|---|---|---|---|
| 4,816,008 A | * | 3/1989 | Leonard | 474/47 |
| 5,637,046 A | * | 6/1997 | Ha | 474/53 |
| 5,830,093 A | * | 11/1998 | Yanay | 474/49 |
| 6,267,699 B1 | * | 7/2001 | Gruich et al. | 474/49 |
| 6,741,045 B2 | * | 5/2004 | Kitamura | 318/14 |
| 2005/0227797 A1 | * | 10/2005 | Jeng | 474/47 |

* cited by examiner

*Primary Examiner* — Sang Kim
(74) *Attorney, Agent, or Firm* — John D. Gugliotta, PE, Esq.

(57) ABSTRACT

A versatile, variable gear ratio mechanical transmission system is providing having similar first and second spaced Disc Subsystems connected by a belt or chain. Each subsystem of which comprises three primary components: (1) a Shift Actuation Structure located at one outermost side; (2) a Receiving Disc located at the opposite side; and, (3) a Retention Disc sandwiched between. The Retention and Receiving Discs accommodate concentric rings of proportionally spaced holes in which corresponding smooth, contoured or toothed Headed Pins are maintained, engaged, or retracted. When the pins are engaged, they span the slot between the Receiving Disc and Retention Disc and interface with the conveyance transferring load from Driving Disc Subassembly to the Driven Disc Subassembly.

29 Claims, 10 Drawing Sheets

(b) Shifting Pins from Engaged (Drive) Position to Neutral Position, Cam Lobe in Neutral Position

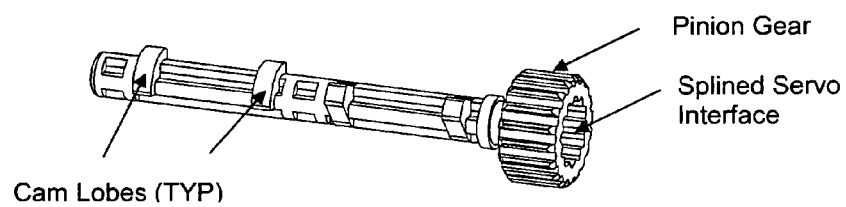
Figure 9
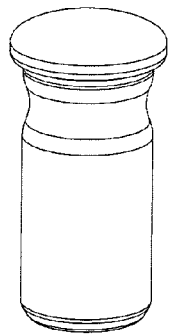
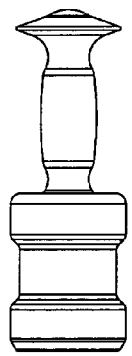
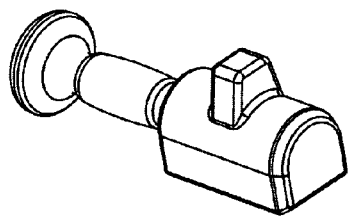
Figure 10a      Figure 10b      Figure 10c

VERSATILE VARIABLE GEAR RATIO TRANSMISSION

RELATED APPLICATIONS

The Present application incorporates subject matter first disclosed in U.S. Ser. No. 12/267,098 filed on Nov. 7, 2008, as well as 10/301,906, filed Nov. 22, 2002, which was a Continuation-in-Part of U.S. Ser. No. 09/620,184, filed Jul. 20, 2000. The present application incorporates subject matters of the '098, and now abandoned '906, and '184 patents as if they are fully rewritten herein.

BACKGROUND OF THE INVENTION

1. Field of the Invention

The present invention relates generally to variable gear ratio transmissions and, more particularly to novel pin configurations and differential shifting arrangements for variable gear ratio transmissions that utilize rings of moveable pins to vary drive ratios.

2. Description of the Related Art

Roughly 100 million bicycles are produced each year worldwide, and the gear-chain-derailleur system is the transmission used to move most all of them. An alternative concept appeared in the early 1980's when a different type of bicycle transmission system was proposed by Iseman in U.S. Pat. No. 4,457,739. In that system, individual rows of concentric metal pins in parallel discs were installed across or retracted from the gap between them using magnets and a linear slide device. The polarity of the magnets was used to shuttle pins on a given row across the slot between discs, effectively altering the diameter around which the bicycle drive chain passed and thereby the ratio between driven and driving entities. Later, unpatented designs by others moved away from magnetically actuated metal pins and towards mechanical manipulation of non-metallic pins for the transmission. Early designs with the non-metallic pins were inefficient, noisy and lacked the pin shuttling speed necessary to prevent pin head decapitations during pin manipulations. This shortfall was remedied by Lane in U.S. Ser. No. 12/267,098.

Testing of the design associated with U.S. Ser. No. 12/267, 098 revealed a number of practical deficiencies, mostly associated with complexities in the shifting mechanism. It was discovered that: tight tolerances had to be held on various parts to affect a successful shift; the additional moving parts in the design created the need for greater shifting forces. Instituted design modifications altered the forces affecting pin movement, leading to an increase in pin binding and friction; and wear and noise remained practical concerns. The modified design also did not include options for the system load transfer component (the chain conveyance). Alternate shift actuation methods (e.g. mechanical cable versus electrical activation, etc.) were also not incorporated. These design considerations are addressed in the present disclosure. The new design is further intended for broader applications, well beyond use on bicycles.

U.S. Ser. Nos. 12/267,098, 10/301,901 and 09/620,184 represent early designs of the transmission system. These applications are incorporated herein as if they are fully rewritten.

The present invention provides an improved apparatus and method having benefits and characteristics not previously disclosed. The present invention utilizes less complex technology, yet it is a more reliable system for shift urging.

SUMMARY OF THE INVENTION

It is a primary object of this invention to provide an alternative to the common derailleur system that is at present almost exclusively used on bicycles. The invention however is not limited to bicycle applications. Other human-powered and non-human powered apparatuses can benefit from its use. It is therefore an object to teach a multi-purpose, reliable, variable gear ratio transmission of relatively simple construction.

It is a further object to provide a simple power transmission system for any multi-speed component, system, device, etc. employing a differential gearing system to modify the relationships between speed and torque of input and output force, power, velocity and displacement.

It is an object to achieve a variable gear ratio transmission of relatively simple construction with low or potentially no lubrication requirements.

It is yet an object of this invention to permit the optional use of a conventional (chain) or a "cleaner" conveyance such as a belt between "front" and "rear" subsystems of the transmission. The design can therefore accommodate a chain or belt as the force transfer entity.

It is further an objective of this design to allow for a wider and greater range of gearing options than currently available when a belt is used as the conveyance between a driving and driven component. In human-powered vehicles, gear ratios for belt-drive systems are limited since the belt cannot be moved from one gear to an adjacent gear as in a derailleur system. Instead, planetary gear sets in wheel hubs are used. Such systems are limited in their achievable number and range of gear ratios.

It is an objective of this differential transmission system to accommodate belts and chains of "closed" and "open" configurations. For "closed" configurations a solid belt or chain convolutes would engage with "gear" pins. With "open" belts or chains, the transmission pins would include a "tooth" to engage with the open or perforated segment of the chain or belt.

It is an additional object to make the assembly light weight. It is anticipated that many parts of the assembly will be manufactured from lightweight metallic or non-metallic materials or combinations thereof. The use of technologically advanced materials such as Metafuse®, a polymer-type material with an impregnated metal coating, is also envisioned.

It is a further object that the transmission be adaptable to different applications. Differential gearing ratios can be modified to accommodate various torque ranges as needed for human powered vehicles or industrial/commercial powered equipment and machinery.

It is an object of this transmission to actuate shifts mechanically or electrically. The design accommodates a conventional mechanical, cable-actuated/spring return configuration as well as an electric servo-motor driven arrangement. A direct-drive or indirect drive arrangement is equally accommodated.

It is another object to for the transmission to minimize the applied force necessary to affect a shift to a new gear. The reduced shifting forces of the present design enable shifts to be accomplished via a small electric motor and small, low power battery source.

A further object is to accomplish gear changes by way of an electrical signal delivered by wires or wirelessly. In current hand cycle designs, crank-mounted mechanical gear shift cables include cyclic loading that repeats with each hand crank revolution. The repeated cyclic loading leads to fatigue-induced premature failures of the cables. A wireless shift system with a crank-mounted switch maintains the convenience of shifting while cranking without the cable fatigue problem.

It is an object of this design to optionally use the transmission in an "automatic" configuration wherein an input such as wheel speed or input torque or load is used to select a particular gear. The gear to be selected would be computer controlled; preset gears for given wheel speeds or input torque would be pre-assigned, programmed by the user, or manually over-ridden in this configuration.

Relative to the design of Lane U.S. Ser. No. 12/267,098, it is an object of this invention to reduce wear caused by continuous rubbing of pins on pin guides. In the present design, individual pin retainers are used in place of pin guides.

It is a further object of this invention to minimize pin movements during gear shifts. A single row of pins only is moved for a shift to a sequential gear versus movements of multiple rows in U.S. Ser. No. 12/267,098. Pins are left in place for all "smaller" gears than the current gear in the present design.

For greatest flexibility in application on human powered vehicles of all types, it is an objective of the present design to minimize the total width of the drive system components. Drive system components for bicycles and hand cycles must fit between input cranks and frame members and between the driven wheel and frame members. Optimally a given disc subsystem will be no wider than the parallel gear set it is substituted for.

Conveyance "drift" on the pins of a disc subsystem creates the potential for rubbing of the conveyance on the discs between which it passes. It is therefore an object of this invention to minimize this rubbing potential by keeping the conveyance centered in the slot between the discs to the greatest extent possible.

With the final object of reducing shift force requirements relative to those of U.S. Ser. No. 12/267,098, the shift mechanisms have been simplified and the number of moving/rubbing parts reduced. The current shift mechanisms are more reliable and robust than those of the previous design.

Briefly described according to a preferred embodiment of the present invention, the multiple-ratio drive transmission, 10 (shown in FIG. 1), comprises first, 11 and second, 12 spaced disc subsystems, as seen in FIG. 2, connected by a conveyance, 13. Each subsystem can vary in size and is composed of three separate primary components, as presented in FIG. 3: a receiving disc, 16 located at one side; a shift actuation subassembly 174 in disc form, as an arm, bracket, or other, located at the opposite side; and, a pin retention disc, 15 sandwiched between. The retention and receiving discs comprise concentric rings of proportionally spaced holes through which corresponding pins are maintained, inserted, or retracted. A conveyance slack take-up device, 14 is used between the disc sub-systems.

Beginning with a disc subsystem in its lowest gear, meaning, shifting occurs as follows. As the disc subsystem rotates, each pin in a row passes through the shifting zone, wherein deflecting ramp components are located. There is one ramp per row of headed pins. The "default" position of each ramp is such that any pin that is currently engaged, i.e. bridging the gap between discs, is extracted, while already extracted pins are allowed to pass unencumbered. With the ramps in their default position, the conveyance interfaces with the innermost pin row, the fixed row of headless pins. Upon a shift request, a selection cam shaft is rotated and sequential deflection ramps are tilted such that pins interfacing with them are moved into the "drive" position. The ramp for the selected gear causes the corresponding ring of moveable pins to be inserted, thus spanning the conveyance slot. As the pins install, the conveyance interfaces with the newly inserted pins, which are at a different diameter than the previously engaged row, and the gear ratio is completely changed after one disc revolution, resulting in an "upshift" or conveyance shift to a larger size gear. All outboard or larger "gear" rows of pins not bridging the conveyance slot are held in a neutral or retracted position in the retention disc, while all lower gear pins are left in an engaged, but unused position, inboard of the active gear.

Upon "downshifting" a similar sequence of events takes place, however the outermost ring of pins are sequentially extracted instead of inserted by the deflection ramps. The conveyance is moved to a row of pins on a smaller diameter, resulting in a "downshift". Because the conveyance does not interface with the pins in the shifting zone, the insertion and removal of pins requires very little force.

BRIEF DESCRIPTION OF THE DRAWINGS

Advantages and features of the present invention are better understood with reference to the following, more detailed description and claims, taken in conjunction with accompanying drawings, in which like elements are identified with like symbols, and in which:

FIG. 9 presents a schematic of a disc subsystem cam shaft, 25 used to actuate the deflection ramp, 24 components.

FIGS. 10*a*, 10*b* and 10*c* show alternate headed pin designs, including a basic pin design, a design with a contoured body for conveyance centering in the conveyance slot and a short neck pin for a slimmer design of the transmission, wherein headless pins have the same body design as the headed pins;

DESCRIPTION OF THE PREFERRED EMBODIMENTS

The best mode for carrying out the invention is presented in terms of its preferred embodiment, herein depicted within the Figures.

1. Detailed Description of the Figures

FIGS. 1 through 12 represent a variable pear ratio transmission, 10, hereinafter "transmission", and its components according to a preferred embodiment of the present invention. The present transmission, 10 is shown adapted for use on a handcycle or bicycle; however, the teachings may be used for other applications which utilize variable speed drive systems such as other human-powered vehicles, motorized cycles, motor vehicles, and powered mechanical equipment in general, etc.

Figure 1A:
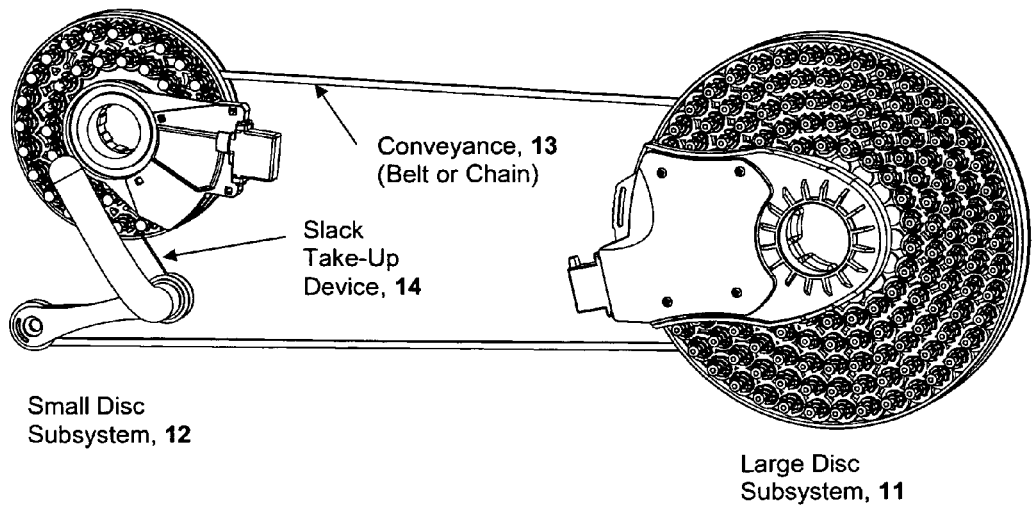
FIG. 1*a* is a front side elevational view of a complete Transmission System, 10.
Figure 1B:
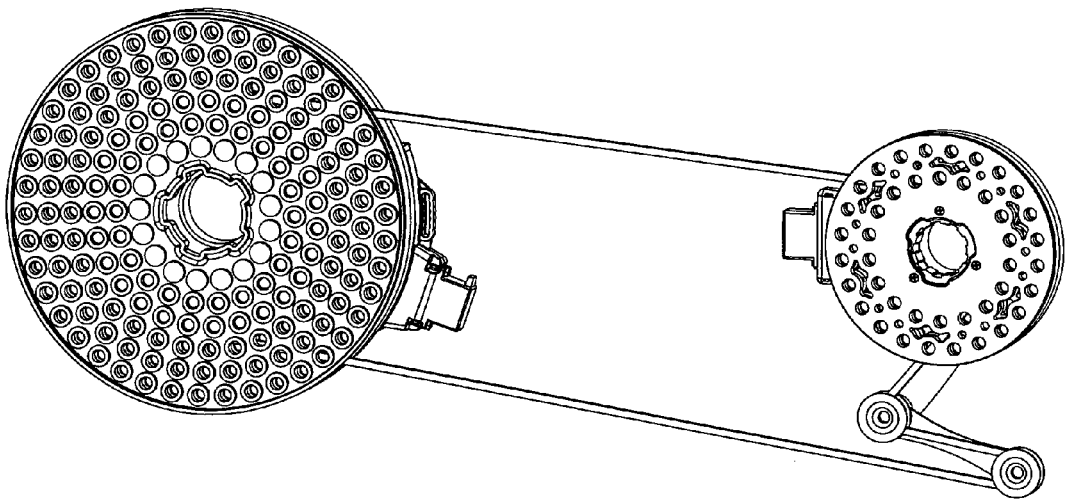
FIG. 1*b* is a rear side elevational view thereof.

This transmission 10 includes at least the following major components:
(1) a drive subassembly, for example FIG. 2;
(2) the driven subassembly, for example FIG. 2;
(3) a conveyance for load transfer from the driving subcomponent to the driven subcomponent, such as a continuous loop belt or chain, with a pitch and links/length to accommodate the gear ratio range and the distance between the drive subassembly and the driven subassembly. This conveyance resides in the slot, 20 between the retention disc, 15 and the receiving disc, 16 in FIG. 3;
(4) a slack prevention device, 14 to accommodate variations in conveyance length with the selected gearing as shown in FIG. 1.

Figure 3:
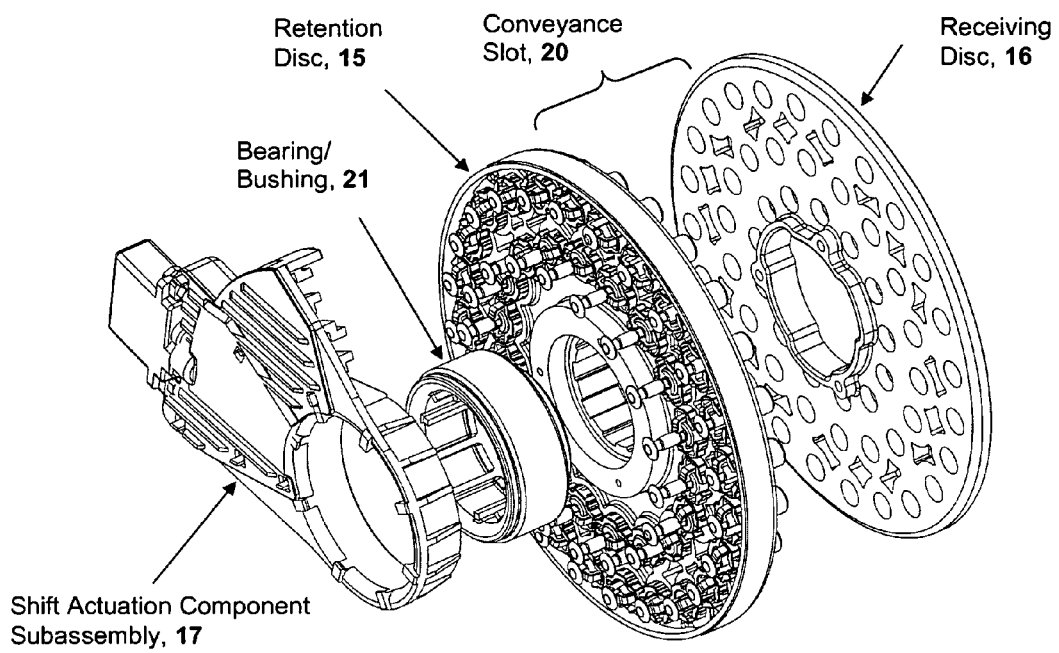
FIG. 3 is an exploded view of the disc subsystem of FIG. 2.
Figure 4:
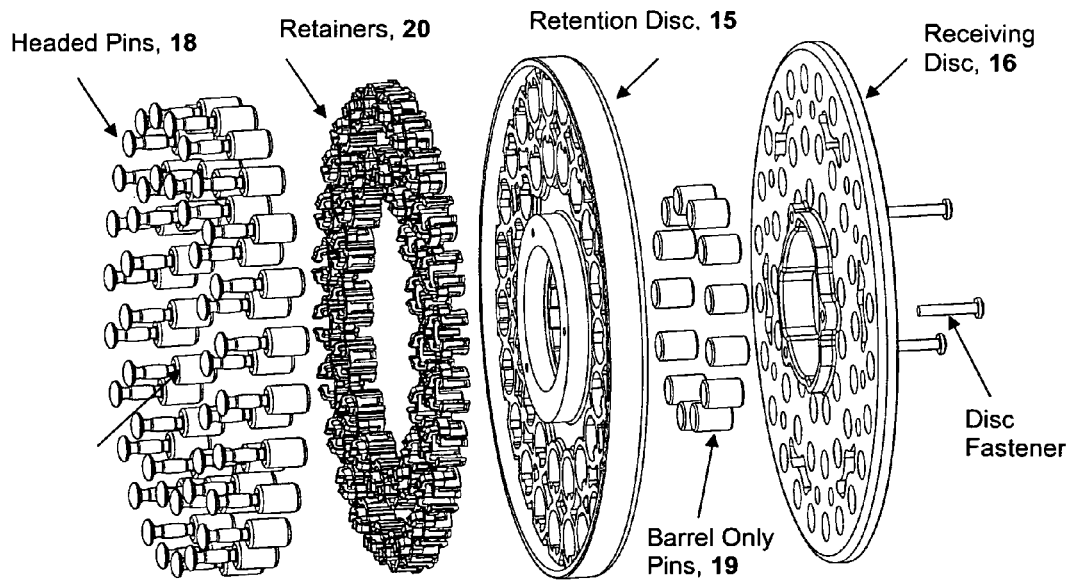
FIG. 4; shows an exploded view of a retention plus receiving disc set assembly.

Comprising the driving and driven sub-components are the following parts, depicted in FIG. 3 and FIG. 4:
(5) a pin retention or holding disc, 15;
(6) pin receiving disc, Item 16,
(7) a shift actuation subassembly, 17
(8) headed pins, not necessarily circular, 18;
(9) barrel-only pins, not necessarily circular, 19;
(10) pin retainers, 20;
(11) an arm bearing or bushing, 21.

Figure 5:
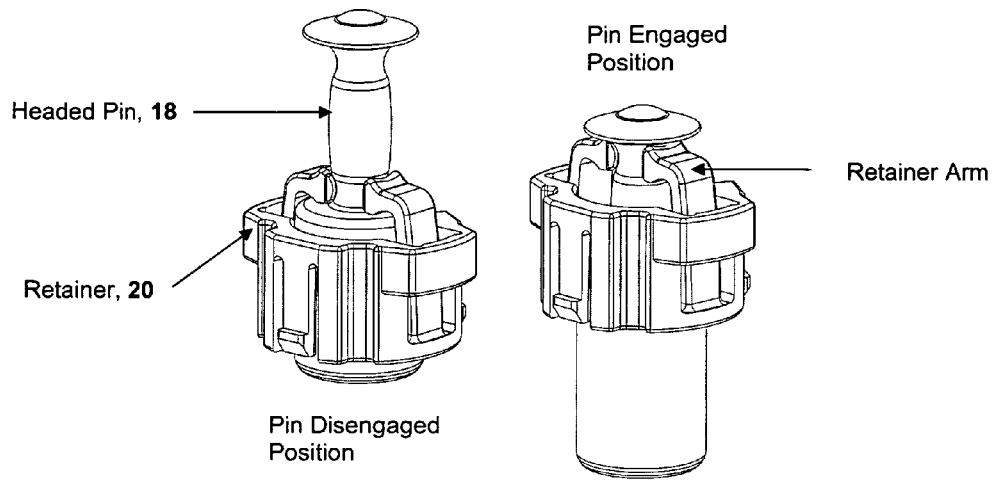
FIG. 5 depicts a pin in its two limiting positions in the retainer structure, the neutral or disengaged position, and the engaged or drive position.

The pin retention disc, 15 keeps the pin retainers, 20 which in turn keep the headed pins, 18 in either an engaged or disengaged position as shown in FIG. 5. Barrel-only pins are captured between the retention disc, 15 and the pin receiving disc, 16, which are held together with fasteners.

Figure 6:
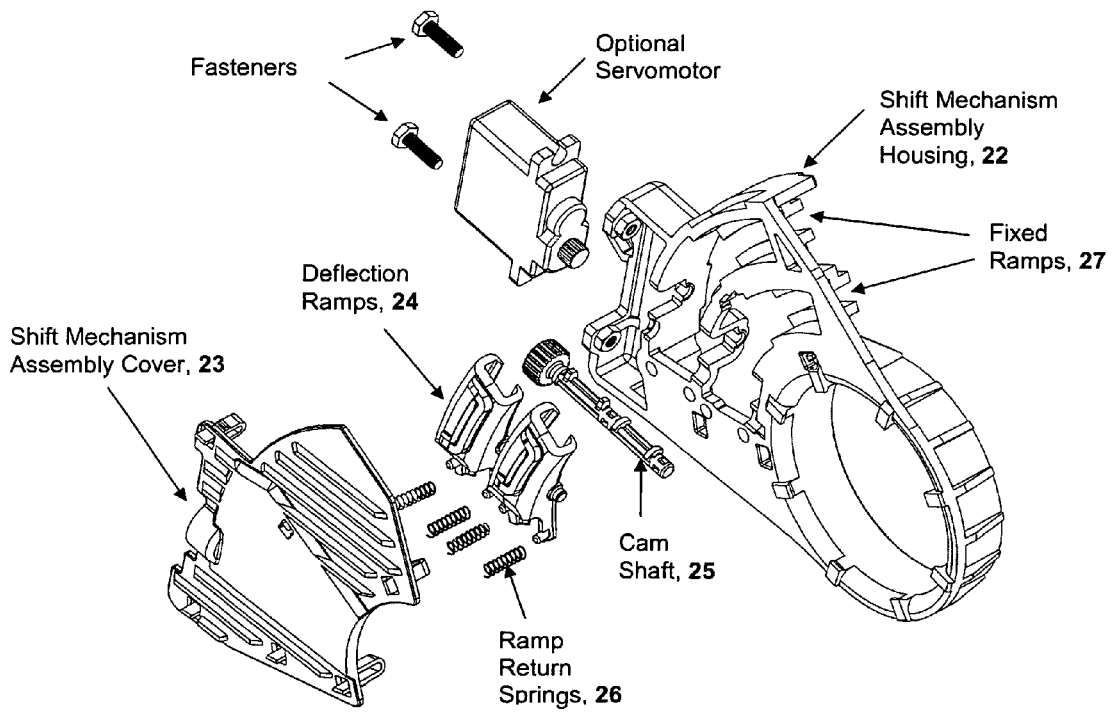
FIG. 6 is an exploded view of the Shift Actuation Subassembly, 17 with related components.

Within the shift actuated subassembly, 17 are the following parts shown FIG. 6:
(12) a shift actuation assembly housing, 22;
(13) a shift actuation assembly cover, 23;
(14) pin diversion components referred to as deflection ramps, 24 and fixed ramps, 27, the number of which corresponds with the number of headed pin rows in a given driving or driven disc subassembly, that are situated in cradles integral with the shift mechanism assembly housing, and;
(15) components to control the deflection ramps and thereby affect a gear shift. These structures comprise a cam shaft, 25, ramp springs, 26, and either a wire rope-controlled rack gear, 61 for mechanical control or an optional servomotor for electric control that can be energized via electrical wires or wirelessly. FIG. 7 presents schematics of these shift activation options. The cam shaft has a pinion gear to mesh with the rack gear; the inside of the pinion gear is splined to accommodate the splined end of an electric servomotor. When wire rope-controlled shift activation is used, a rack gear, 61, rack gear return spring, 51 are added to the system.

Greater detail is provided below to the functionality of one of the disc subsystems; however, similar structures and features may be repeated for the other disc system. Either disc system can be the driving or driven component. Modifications can be made to the design of either disc system without straying from teachings of this disclosure.

A subassembly disc system such as that in FIG. 3, comprises a set of discs 15, 16 with concentric rows of proportionally spaced holes plus the shift actuation subassembly 17. Pins, 18 are inserted into the holes to change to a "larger" drive gear for the transmission 10, and they are retracted to shift to a "smaller" drive gear. As the discs in a system rotate, each pin, 18 passes through a shifting zone having a Shift Actuation Subassembly, 17 including a plurality of moveable deflection ramps, 24 contained therein. The Shift Actuation Subassembly, 17 comprises a housing, 22 plus cover, 23 with a rotating cam shaft, 25 and ramp return springs, 26. The rotating cam shaft, 25 rotates to urge sequential movement of deflection ramps 24. A cam housing cover 23 retains the cam shaft and springs. By rotating the gear selection cam shaft 25, deflection ramps 24 extend into the drive position and urge the pins passing through the affected ramp. The deflected ramp, 24 in conjunction with the corresponding fixed ramp, 27, causes the associated rows of headed pins 18 to insert to the drive position for the selected gear ratio. The chain/belt conveyance engages as the pins 18 install; the gear ratio completely changes during one revolution of the disc assembly. All pins not engaged across the conveyance slot and outboard of the currently selected pin row are held in the neutral (retracted) position. Those pins inboard of the currently selected pin row are maintained in an engaged position.

Figure 2A:
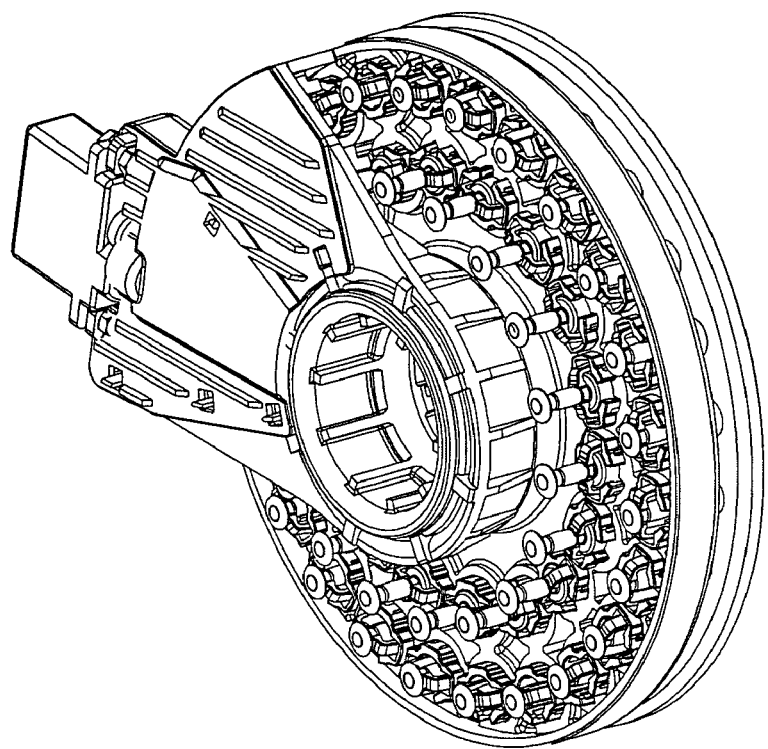
FIG. 2*a* shows a front side view of one disc subsystem of the overall transmission.
Figure 2B:
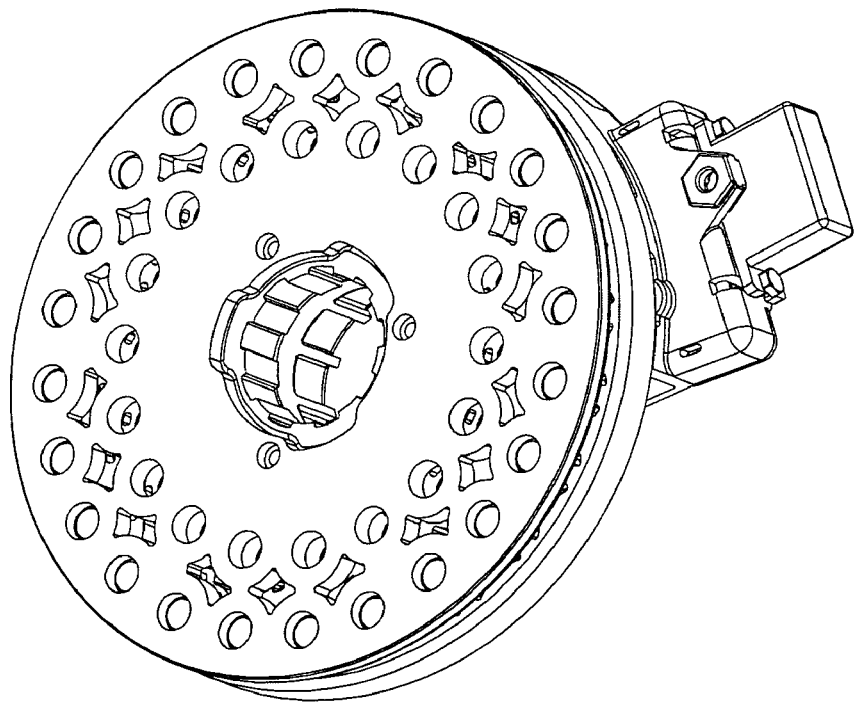
FIG. 2*b* is a rear side elevational view thereof.

Referring now to FIG. 3, a front side exploded elevation view of the smaller disc subsystem, 12 of FIG. 2, of an overall transmission system, 10, as shown in FIG. 1 is discussed. Teachings are the same essentially for both the driving disc system and the driven disc system. The depicted smaller disc system of FIG. 3 consists of three concentric rings of proportionally spaced holes with corresponding pins, 18. These rings represent three drive ranges of the transmission. Similarly, a larger disc system such as that in FIG. 1 may consist of six or more concentric rings of proportionally spaced holes; these rings represent further gearing of the transmission. When such a combination of driven and driving systems are used in conjunction with different pin row diameters, a total of eighteen different speed ranges are available. Each disc system in FIG. 1 is interchangeable as the driving or driven component. A supporting structure, such as equipment housing or a bicycle frame, holds the driving and driven disc systems in position. A chain, belt or other conveyance interconnects the two disc systems for purposes of transmitting mechanical power. Within each system is a shifting zone wherein the conveyance is not interfacing with the pins and, wherein adjustments take place regarding the active gear to be used for the transmission of power.

FIG. 3 shows a side view of a sample small disc subsystem 12, which consists primarily of three structures: (1) a shift actuation subassembly, 17 located at an outermost side; (2) a pin receiving disc, 16 located at the opposite side; and, (3) a pin retention disc, 15 sandwiched between. The actuating structure, 17 is static; hence, it neither rotates nor moves relative to the frame structure to which the system is mounted. The pin retention disc, 15 and the pin receiving disc, 16 form a stable and strong platform capable of handling torque input by an energy source such as a bicycle crank at the drive end, or the system conveyance at the driven end. A conveyance retention slot, 51 is formed between the pin retention disc, 15 and the pin receiving disc, 16 to prohibit a disengagement of the conveyance.

Each of the proportionally spaced holes is capable of housing its own respective headed pin, 18. A headed pin, 18 that is not engaged is interim stored in the retention disc, 15 until it is called upon for deployment by the shift actuation subassembly, 17 and deflection ramps, 24. Pins are retained in the engaged or disengaged position by way of retainers, 20. Because the conveyance must engage a row of pins, 18 at all times, the innermost ring of pins is permanently deployed using barrel only pins, 19. The barrel body only pins, 19 are permanently installed in the corresponding innermost ring of holes on the pin receiving disc 16, which are blind holes, 56 even if an outboard ring of proportionally spaced holes is simultaneously deployed.

Each concentric ring in the pin receiving disc, 16 and the pin retention disc, 15 comprises a greater number holes than the inner ring adjacent to it and proportional spacing is maintained. In the demonstrated design of FIG. 4, the innermost pin row includes thirteen holes whilst the second row has eighteen holes, and the third row has twenty-four holes. This description applies similarly to the front disc system, but with different numbers of pins/holes in each concentric row.

Figure 11A:
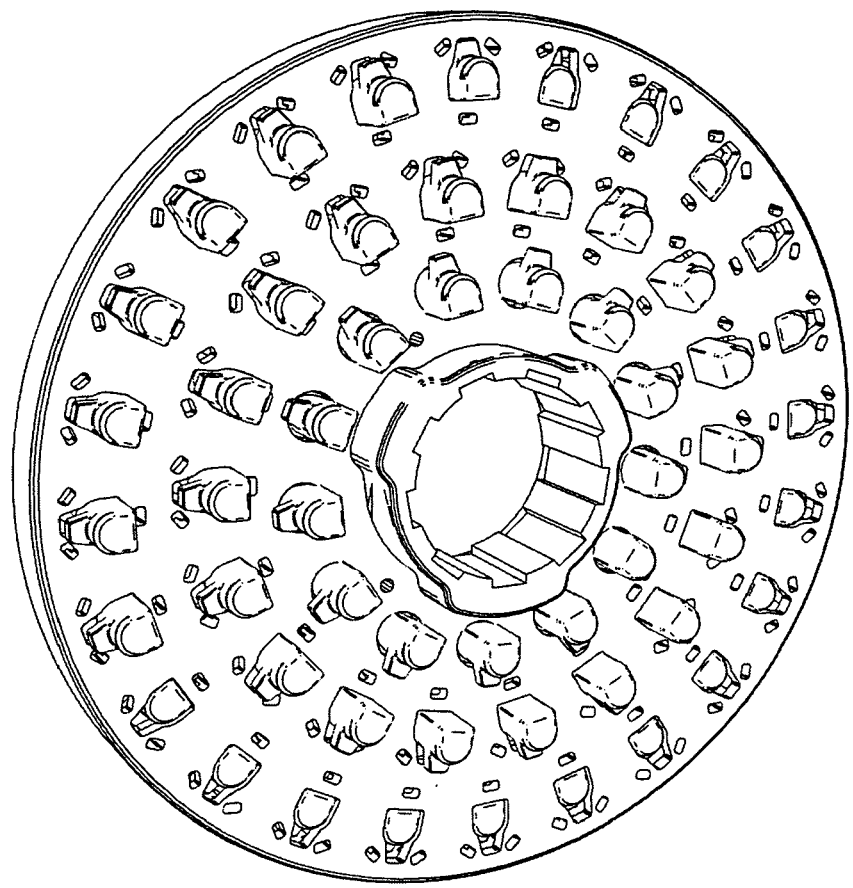
FIG. 11*a* through FIG. 11*b* present sample alternate pin and pin hole designs for use with different conveyance types.
Figure 11B:
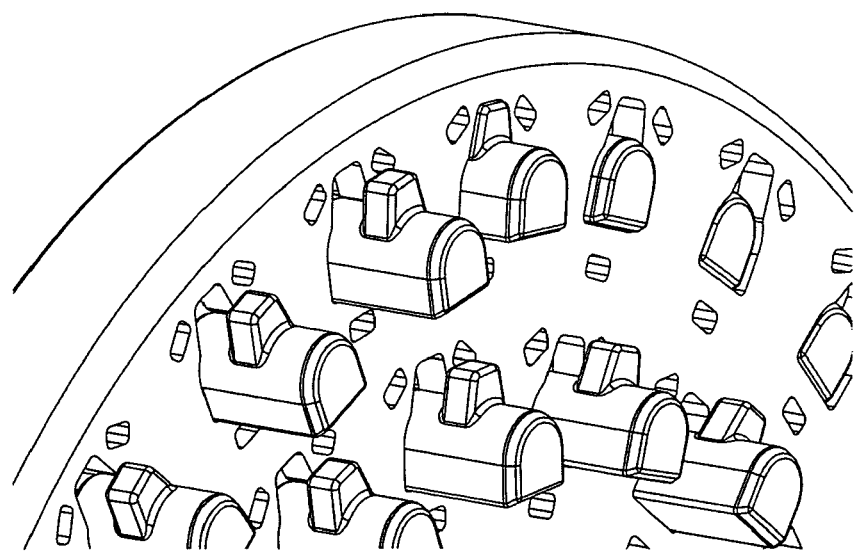
Figure 12A:
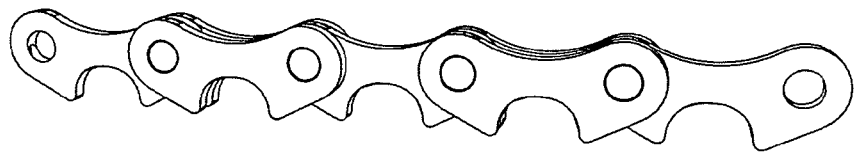
FIG. 12*a* through 12*d* shows optional conveyance types for load transfer between transmission subassemblies.
Figure 12B:
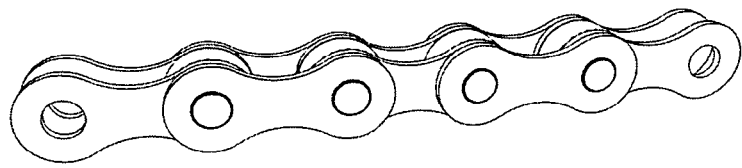
Figure 12C:
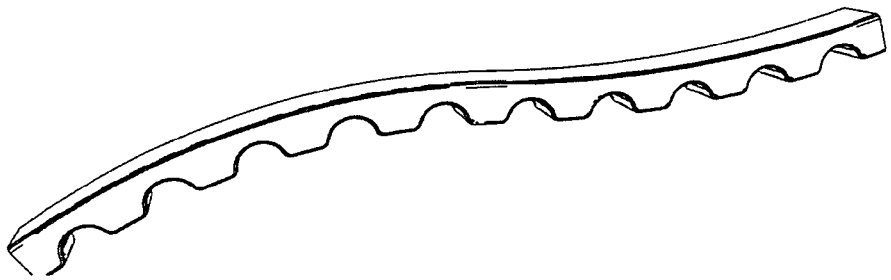
Figure 12D:
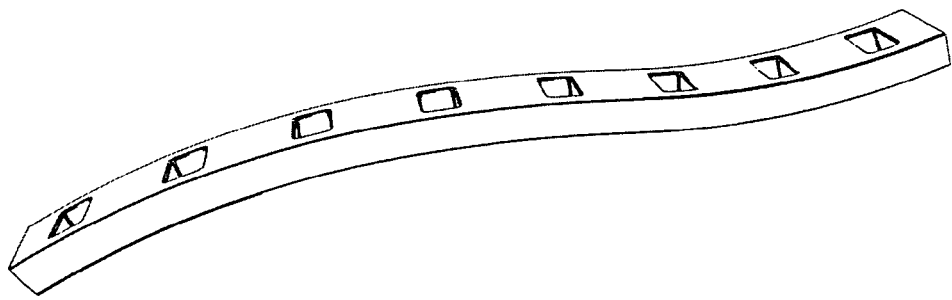

Details of the retention disc plus receiving disc assembly, 15 are shown in FIG. 4. Retainers, 20 used to maintain the headed pins in an engaged or disengaged position, are pressed into and held to the retention disc by way of tabs on the retainers that fit into receptacles on the disc. Headed pins, 18 insert into the retainers, 20 and engage with them at detents in the neck profile. On the other side of the disc, barrel only pins, 19 fit into blind holes, 56 in disc 15 and disc 16 in the innermost, blind hole row. An alternate headed pin design eliminates the pin neck and incorporates the detent in the pin body. In such a design, the pin head is made larger than the pin body and a detent is included in the body just below the head as depicted in FIG. 10. A further modification to the pin design is envisioned for use with a traditional chain conveyance or a perforated belt. In particular, each pin would include a tooth structure that would interface with the chain or belt, as depicted in FIG. 11.

In FIG. 6, the components of the shift actuation subassembly, 17 are shown. This subassembly is a mechanical device having various moving parts; the rotary cam shaft, 25, the deflection ramps, 24, fixed ramps, 27, the deflection ramp return springs, 26 and optionally a rack gear return spring, 51 that can be seen in FIG. 7a. Components are contained within a housing, 22 with a cover, 23. The cam shaft rests in a built-in cradle in the housing. The rack gear return spring is used with a wire rope cable shift mechanical actuation system. Deflection ramps, 24 are activated by the lobed cam shaft, 25 and returned to their default position by the ramp return springs, 26 when deactivated by the same. The deflection ramps, 24 perform two functions: (1) urge disengaged pins into a drive position when selected; and (2) capture engaged pins to return them to the neutral position when deselected. Fixed ramps, 27 complete the pin engagement action initiated by the deflection ramps, 30.

Figure 7A:
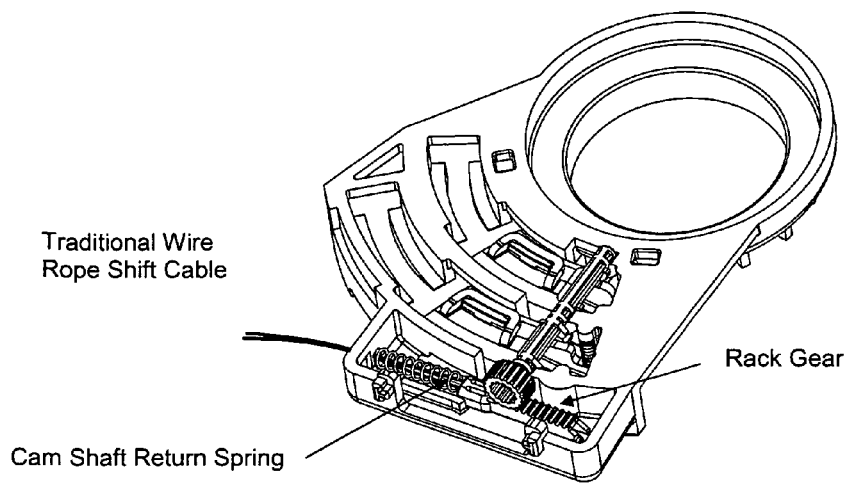
FIG. 7*a* and FIG. 7*b* present optional means of shift activation for the transmission, respectively.
Figure 7B:
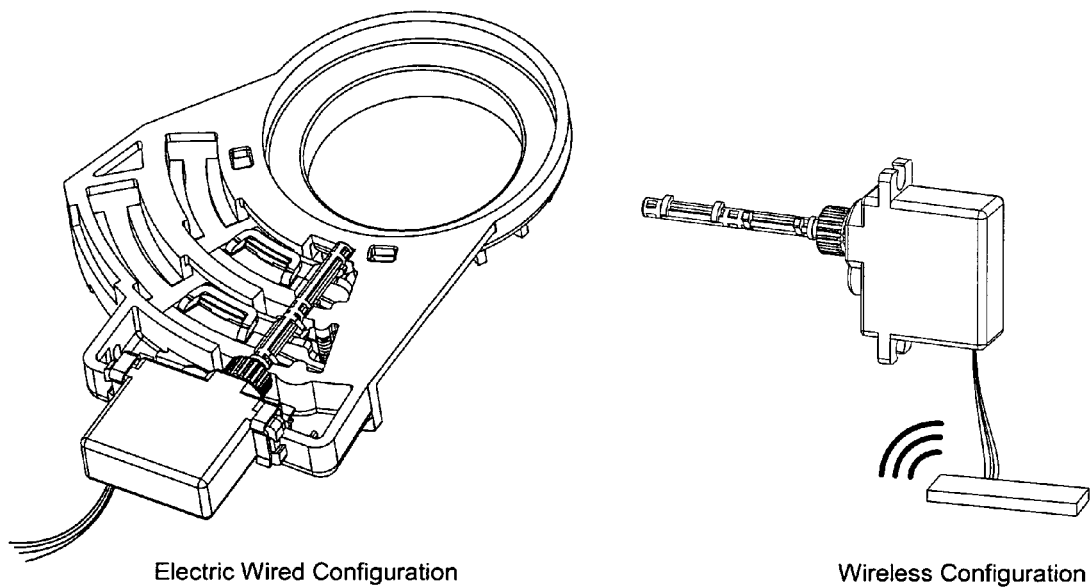

Cam shaft, 25 rotation to affect a gear shift can be accomplished by a shift cable connected to shift levers with the arrangement in FIG. 7a, or using an electric motor connected to a power source and triggering switch(es). In case of electric motor actuation, signals to the motor can be sent by electric wire, or wirelessly using a small transmitter and receiver, as shown schematically in FIG. 7b. When electric motor actuation is used, upshift or downshift signals can be initiated by a user in a "manual" shift mode, or "automatically" by a computer processor using sensors and real-time data such as wheel speed or applied input force or torque. These various options are easily accommodated by the present transmission design.

Figure 8A:
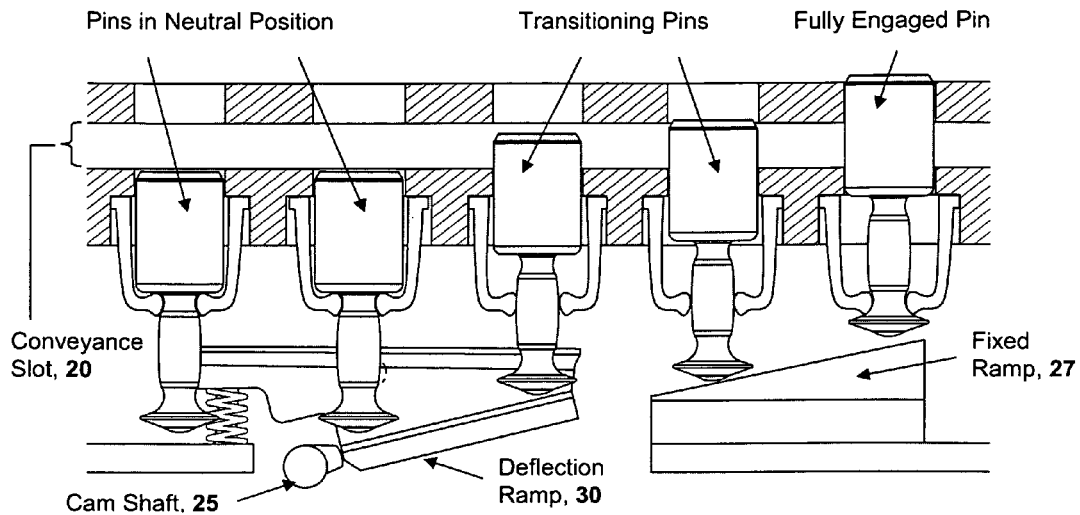
FIG. 8*a* and FIG. 8*b* are schematics depicting pins being engaged or disengaged after a shift request, respectively.

Moving parts of the shift actuation subassembly, 17 are shown in relationship to the headed pins, 18 as they move through the shift zone in FIG. 8. Upon initiation of a gear upshift, the rotary cam shaft, 25 is turned, bringing a cam lobe around to tilt a deflection ramp to a position as shown in FIG. 8a. As headed pins, 18 pass through the shift zone, the tilted ramp imparts a force on them to push them into an engaged or "drive" position, overcoming the retainer arm force holding them in the neutral position. In the engaged position, the pins span the conveyance slot 51 between the retention disc, 15 and the receiving disc, 16 lifting the conveyance to a larger diameter and effecting a change in "gear" ratio. After one full rotation of the disc, all pins in a select row will have been moved into the engaged or "drive" position. At this point, all returning pins pass freely through the ramp structure and are unaffected by the same.

Figure 8B:
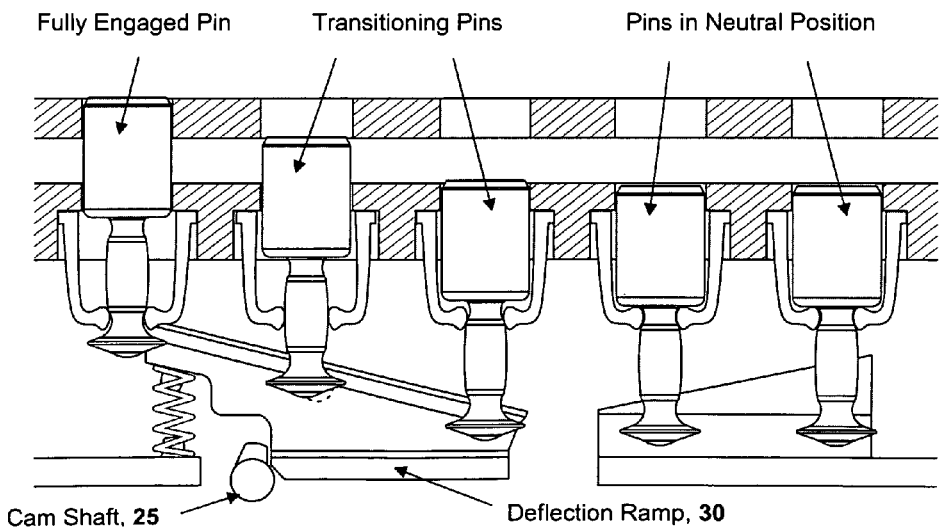

To affect a downshift, the procedure is as follows. The cam shaft is rotated to move a lobe away from its interaction with a deflection ramp (e.g. from a position as shown in FIG. 8a to a position as shown in FIG. 8b). The spring acting between the ramp and the shift mechanism housing urges the ramp back to its default position. The newly displaced ramp individually captures the heads of passing pins, 18 (FIG. 8b) brought into the shift zone by the rotating discs 15, 16. The headed pins, 18 on the active row are pulled out of the receiving disc, 16 by the helical ramp, and into the retention disc, 15. The ramps impart a force on the pins that overcomes the retainer arm force holding them in the drive position. The pins are subsequently stowed once again by the retainers in a neutral position. When extracted pins pass through the shifting zone all subsequent times, they are unaffected by the ramp and pass freely through. This design provides for a complete shifting process within one revolution of a disc subsystem.

When the smallest gear on a given disc subsystem is selected, all deflection ramps are in their default or pin capture position as shown in FIG. 8b. All engaged headed pins become disengaged allowing the conveyance to interface with the headless row of innermost pins. Pins that are disengaged or not spanning the conveyance slot 51 are said to be in the "neutral" position.

Pins are maintained in either an engaged or neutral position by retainers, 20 that are attached to the retention disc, 15. FIG. 5 shows the headed pins, 18 in each of the neutral and engaged positions relative to the retainers, 20. The pins are held captive in either of two position by arms integral to the retainers. The progression of pin movements through the retainers during pin engagement and pin extraction can be seen in FIG. 8.

A series of lobes, 59 are spaced along the axis of cam shaft, 25 as shown in FIG. 9. There are two lobes for each deflection ramp and the lobes act on each leg of these U-shaped structures. An existing lobe or additional lobe may used as a stop for maximum rotations in either direction. At the input end of the shaft, a hollowed-out pinion gear is included. The pinion gear interfaces either directly or through an idler gear, 62 with a rack gear for manual shift activation. When an electric servomotor is used with the transmission, the splined end of the servo fits inside the splined hollow of the cam shaft pinion gear, or inside an accompanying idler gear, 62. When no lobes are acting on the deflection ramps, the transmission is in its first, or lowest gear.

Each shift lobe is offset from the adjacent by a displacement angle, which depends on the total number of shift lobes and the type and setup of the shift system. Lobes shapes can be modified to keep the deflection ramps diverted or return them to a neutral position when a shift to a larger gear is made. In the configuration shown in FIG. 10, the lobes are designed to maintain all pins below the currently selected gear in an engaged position.

As should be obvious to a person having ordinary skill in the relevant art, in light of the teachings and inventions herein, that a transmission incorporating the features and elements of the present innovation may be manufactured by means of an injection molding process. It is anticipated that many parts of the assembly could be manufactured from DELRIN® or an equivalent high quality material that both is light weight and has a very low coefficient of friction, so that the transmission is self-lubricating and requires very little maintenance. In cases where higher load capacity is needed, MetaFuse® nanocrystalline metal/polymer hybrid technology may be used. Stamping or casting of some parts from metals such as Aluminum is also envisioned.

2. Description of Alternate Equivalent Embodiments

For compatibility with existing chain designs that interface with toothed gears, it is envisioned that the pins used in the transmission can be modified to include a tooth as shown in FIG. 10c while still maintaining the features and benefits of the current innovation. The pin retention disc holes would require a slight modification to accommodate the toothed pins, also shown in FIG. 11. FIG. 12 shows samples of conveyances that would be compatible with toothed and non-toothed pin designs.

Figure 13:
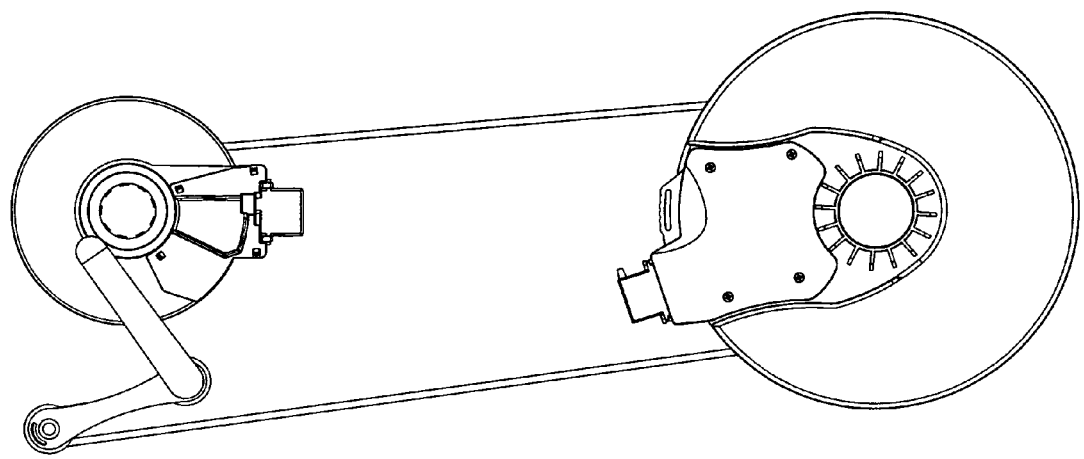
FIG. 13 presents an alternate design full cover shift actuation structure.
Figure 14:
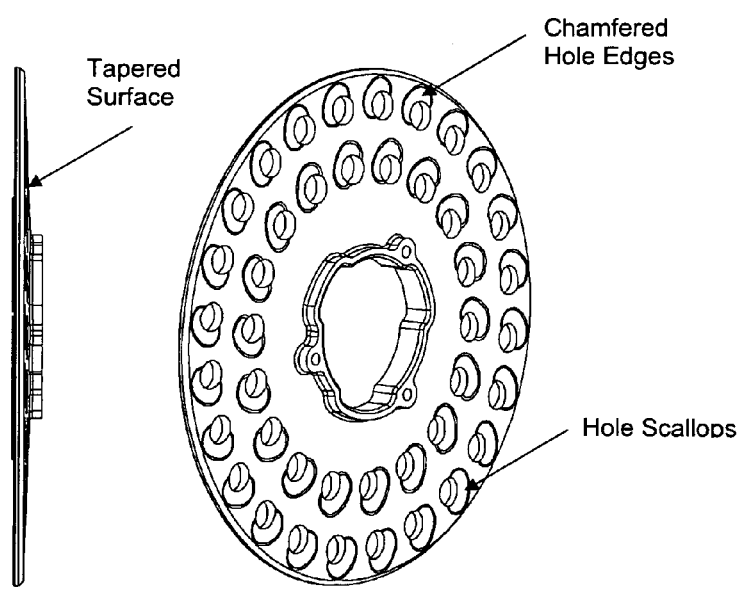
FIG. 14 shows alternate and optional design features for the transmission.

Each disc subassembly may also use an alternate full disc-shaped shift actuated subassembly as shown in FIG. 13 with cover instead of the part circular arm structure shown as 17 in FIG. 3. A cover structure for the entire system, including the conveyance between the disc subassemblies, may also be applied. Such options are envisioned for operation of the transmission in high debris environments as a means of combating the introduction of such debris to the inner workings of the transmission.

Where weight savings is important and the environment is relatively clean, the alternate shift actuation structure, 17 shown in FIG. 3 is intended. In addition, it is envisioned that additional lightening holes can be added throughout each of the disc components. For improved stiffness in the receiving disc, a stiffening rim can be added at the outer diameter on the outside surface. On larger diameter discs, intermediate ring stiffeners can also be envisioned.

The configuration and manner of interface of the ramp return springs, 26 relative to the deflection ramps, 24 may need to be altered for a disc subsystem with more closely spaced pin rows. For example, the springs may be oriented perpendicularly to their current orientation and tension springs may be used in place of compression springs. Furthermore, the metal coil springs of the present design may be replaced with a different spring type comprised of a different material (e.g. a strip or leaf type spring made of a non-metallic).

To slim the width of the transmission, a number of design changes can be made;
  The overall pin length can be reduced by using a neckless pin design as in FIG. 10a;
  Use of Aluminum or similar lightweight metallic materials instead of plastics for the discs would allow for thinner discs, reducing the stroke needed for pin engagement or disengagement;
  Retainers for the headed pins use cantilevered arms perpendicular to the discs to interface with the pins. A different arrangement, such as circumferentially-oriented arms parallel to the disc could alternately be used to shorten the height of the retainers. Corresponding modifications to the shift mechanism assembly housing, 22 the retainers, 20 and deflection ramps, 24 would be needed to accommodate these alternate designs. Reductions in the disc subsystem assembly widths can subsequently be achieved;
  Alternate deflection ramp, 24 designs are envisioned, wherein such ramps can fully insert the pins from the neutral position to the drive position. With such a design, the fixed ramps, 27 can be eliminated.

3. Operation of the Preferred Embodiment

The preferred embodiment of the present invention is used in a simple and transparent manner compared to conventional mechanical transmissions on for example multiple-speed human powered vehicles such as bicycles and hand cycles. The variable gear ratio transmission is constructed of two separate disc subsystems; a driving system having rings of proportionally spaced holes with corresponding headed pins, attached to an input such as a pedal crank; and, a driven disc system having rings of proportionally spaced holes and corresponding headed pins attached to a propulsion entity such as a drive wheel. The two separate disc systems provide distinct gear ratios when taken together, but they can be varied depending on application design and functionality.

For the bicycle application, when changing gears, the conveyance between the driving and driven systems is either lifted or dropped in a single plane as the headed pins extend or retract across the chain retention cavity slot; hence, the conveyance stays in a constant plane with respect to the disc systems. This is in contrast to the side-to-side movement and out-of-plane chain positioning of existing conventional derailleur technology. The conveyance stays engaged with the previous ring of pins as a pedal turns and engages a new ring of pins. The new ring of pins to which the conveyance is engaged is user selected. This construction provides not only for a very smooth and quiet shift, it also eliminates occurrences of chain slippage that can occur with conventional systems. The conveyance captures in the cavity slot between discs which renders it impossible for it to slip off the pins and fall out of the gear. This action allows for continued pedaling, or application of power, throughout the shifting period.

The above mentioned components are based on the present design of a three row gearing for one disc system and potentially a seven row drive range for the other disc system. As would be anticipated by one skilled in the relevant art in light of the present teachings, the number of gear ranges can be altered to suit a specific design criterion or drive application.

The foregoing description of specific embodiments of the present invention is presented for purposes of illustration and description. It is intended neither to be exhaustive nor to limit the invention to the precise forms disclosed and, obviously, many modifications and variations are possible in light of the above teaching. Embodiments are chosen and described in order to best explain principles of the invention and its practical application, to thereby enable others skilled in the art to best utilize the invention and various embodiments with various modifications as are suited to a particular contemplated use. It is intended that a scope of the invention be defined by the claims appended hereto and to their equivalents. Therefore, the scope of this invention is limited only to the following claims.

Having thus described the invention what is claimed as new and desired to be secured by Letters Patent is as follows:
  1. A variable gear ratio transmission, comprising:
    a first disc system and a second disc system operatively interconnected by a conveyance having a slack take-up device, said conveyance either engages at least one concentric ring of headed moveable pins or engages a concentric ring of barrel only pins on each of said first and second disc system;
    said first and said second disc system each further comprising a pin-actuating structure at an outermost side, a pin-receiving disc at an innermost side, and a pin-reten- tion disc sandwiched there between said pin-actuating structure and said pin-receiving disc, said pin-retention disc further being fastened to said pin-receiving disc in a manner forming a slot there between;

said barrel only pins spanning said slot between said pin-receiving disc and said pin-retention disc at an innermost row of blind holes formed by said pin-receiving disc and said pin-retention disc, respectively; and a plurality of retaining devices in said pin-retention disc each corresponding to and for maintaining said moveable pins alternately in an engaged or disengaged position; wherein each said stationary pin-actuating structure further comprises a mechanical shift mechanism assembly having a plurality of moveable pin deflection ramps urged alternately by a single rotating cam shaft and plurality of resisting springs for controlling the movement of said moveable pin deflection ramps.

2. The variable gear ratio transmission of claim 1, wherein said rotating cam shall is spring urged to a return position by a torsion spring.

3. The variable gear ration transmission of claim 1, further comprising an electric servomotor operatively connected to said rotating cam shaft for actuation of said shift mechanism.

4. The variable gear ration transmission of claim 3, wherein said electric servomotion is further adapted for wireless operation of said transmission and automatic gear shifting of said transmission.

5. The variable gear ratio transmission of claim 1, wherein said first disc system is of a first size; and
said second disc system is of a second size.

6. The variable gear ratio transmission of claim 1, wherein said first and second disc system consist of at more than one concentric ring of proportionally spaced holes formed therein and wherein each concentric ring of proportionally spaced holes corresponding to one gear ratio.

7. The variable gear ratio transmission of claim 6, wherein the innermost row of concentric ring of proportionally spaced holes are blind holes, and the outer rows of said concentric ring of proportionally spaced holes are through holes.

8. The variable gear ratio transmission of claim 7, wherein each said blind hole retains said barrel only pin and each through hole retains said headed moveable pin.

9. The variable gear ratio transmission of claim 8, wherein said barrel only pins are permanently installed in said corresponding innermost ring of said blind holes and constantly span said slot between said pin-retention disc and said pin-receiving disc.

10. The variable gear ratio transmission of claim 8, wherein each successive row after said innermost row of said concentric ring of proportionally spaced holes has a greater number of holes and proportional spacing is maintained.

11. The variable gear ratio transmission of claim 7, wherein said proportionally spaced holes have a pin retainer for maintaining said headed moveable pin in an engaged or disengaged position.

12. The variable gear ratio transmission of claim 1, wherein said headed moveable pin is stored in said pin-retention disc until it is manipulated and installed into a drive position by said shift mechanism assembly.

13. The variable gear ratio transmission of claim 12, wherein said headed moveable pins have bodies countered to center said conveyance in said slot between said pin-retention disc and said pin-receiving disc.

14. The variable gear ratio transmission of claim 1, wherein said concentric ring of headed moveable pins corresponds to one gear ratio.

15. The variable gear ratio transmission of claim 1, wherein:
said moveable pin deflection ramps are situated in a series of parallel slots and retained in said shift mechanism assembly by said retaining cover;
said cam shaft is adjacent and substantially perpendicular to said pin deflection ramps; and
said cam shaft depresses one or more of said deflection ramps, and said resisting springs between said deflection ramps and said retaining cover return said deflection ramps to a default position when not manipulated by a cam shaft lobe.

16. The variable gear ratio transmission of claim 15, wherein the pathways of said moveable pin deflection ramps are helical in shape.

17. The variable gear ratio transmission of claim 16, wherein said moveable pin deflection ramps individually displace or allow unencumbered passage of each said headed moveable pin as said pin-retention disc and pin-receiving disc rotate.

18. The variable gear ratio transmission of claim 16, wherein said pin-actuating structure further comprises a cradle or holding said cam shaft allowing forward and reverse motion of said deflection ramps enabling upward and downward shifting.

19. The variable gear ratio transmission of claim 18, wherein said moveable pin deflection ramp has a double ledge to capture said beaded pins from said drive position after a shift request.

20. The variable gear ratio transmission of claim 19, wherein said moveable pin deflection ramp is substantially U-shaped with an inner surface of said U-shape acting to divert said headed moveable pins from a retained position to said drive position after said shift request.

21. The variable gear ratio transmission of claim 1, wherein each said stationary pin-actuating structure further comprises further comprises a retaining cover adapted for providing retention of and physical protection for the moving interior components of said shift mechanism assembly.

22. The variable gear ratio transmission of claim 21, wherein a series of cam lobes are spaced along said cam shall.

23. The variable gear ratio transmission of claim 22, wherein each of said series of cam lobes interfaces with one of said deflection ramps.

24. The variable gear ratio transmission of claim 23, wherein a default position of said moveable pin deflection ramp allows incoming unengaged headed moveable pins in each of said concentric rows to pass though said deflection ramp and stay unengaged until said shift request is initiated.

25. The variable gear ratio transmission of claim 24, wherein said rotating cam shaft places one of said series of cam lobes into contact with said deflection ramp causing said deflection ramp to deflect said headed moveable pins partially out of said pin-retention disc a distance to span the gap between said pin-retention disc and said pin-receiving disc to be installed into said drive position.

26. The variable gear ratio transmission of claim 23, wherein said cam lobes have an extended shape for allowing said headed pins in rows of a lesser diameter than the currently selected gear to remain in an engaged position.

27. The variable gear ratio transmission of claim 26, wherein said cam lobes are truncated for allowing a given row of said headed pins to be in said engaged position only when said corresponding cam lobe on said cam shall activated said corresponding deflection ramp.

28. The variable gear ratio transmission of claim 27, wherein a series of incoming engaged headed moveable pins enter a shifting zone and are urged to a neutral position by said deflection ramp and subsequently are routed through a drive ramp unencumbered on subsequent passage through said shifting zone.

29. The variable gear ratio transmission of claim 1, further comprising:
   chamfers formed on inside edges of said pin-retention disc and said pin-receiving disc;
   partial scallops applied to each hole on an inside face of said pin-retention disc and said pin-receiving disc; and
   the inside surface of said pin-retention disc and said pin-receiving disc formed in a tapered for allowing said slot to be wider tier successive rows of said concentric ring of proportionally spaced holes when moving from smaller to larger diameters of said concentric rows of headed moveable pins.

\* \* \* \* \*